(No Model.) 2 Sheets—Sheet 1.
C. W. PEARSALL.
CAR VENTILATING DEVICE.
No. 552,300. Patented Dec. 31, 1895.
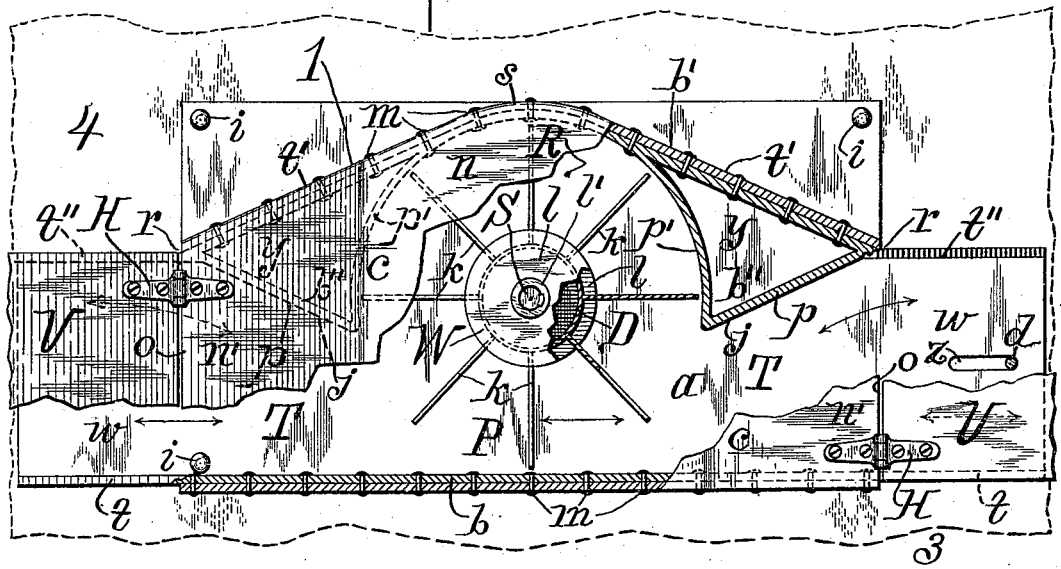
FIG-1-
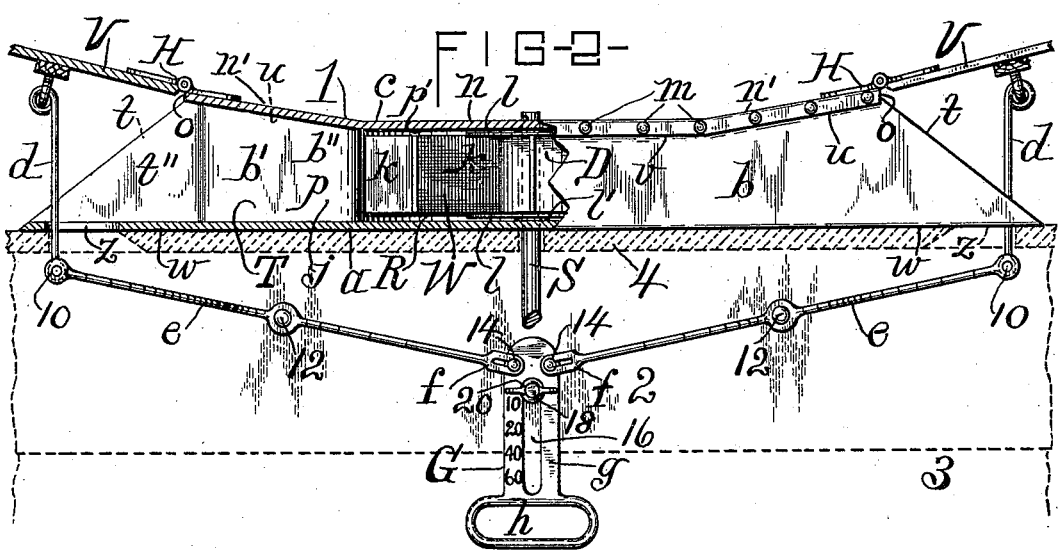
FIG-2-
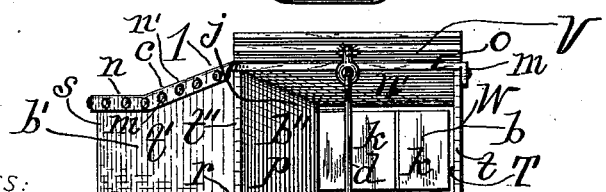
FIG-3-
WITNESSES:
E. Tautenoller
Chas Goss
INVENTOR,
Charles W. Pearsall,
BY Geo. E. Raymond,
his ATTORNEY.

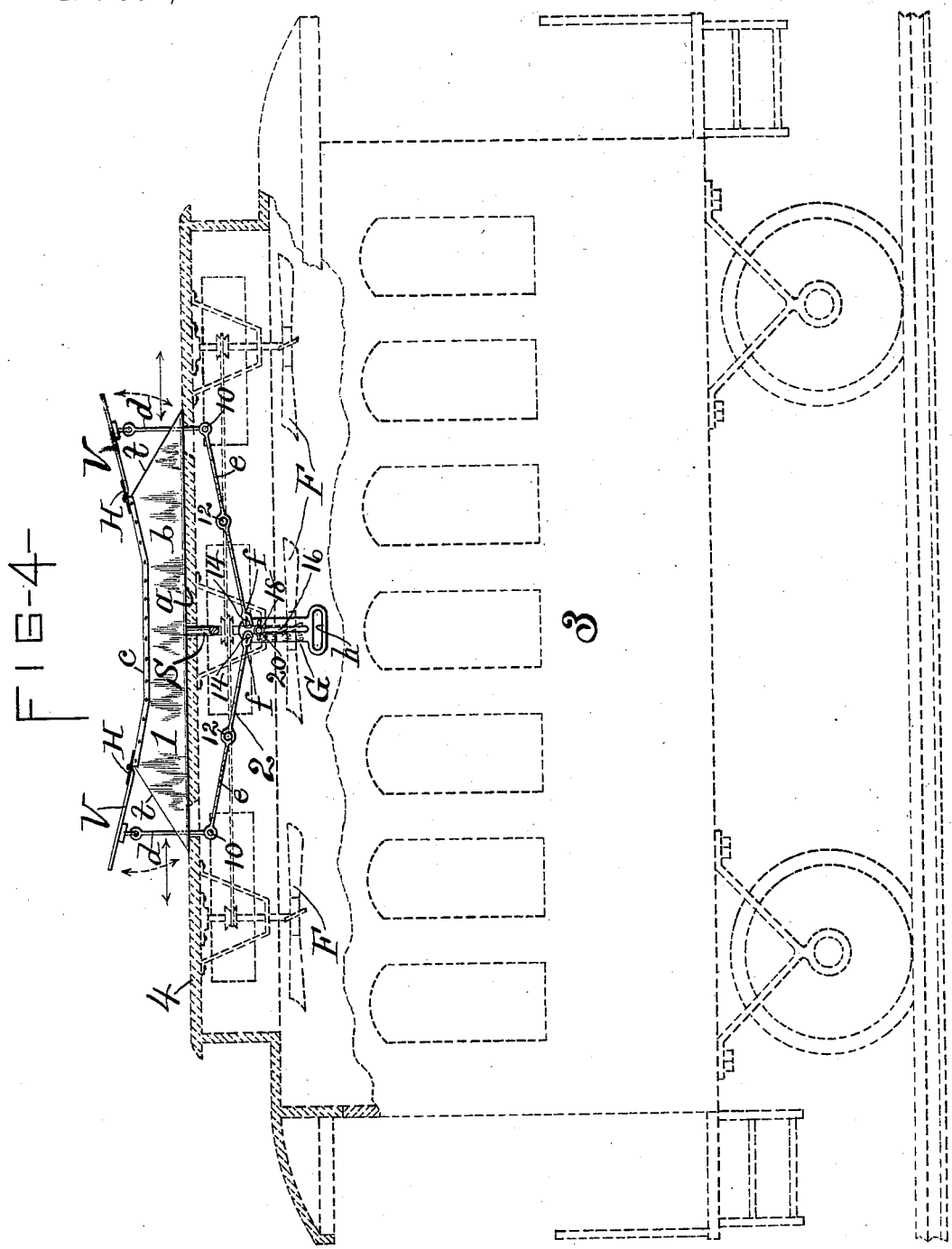

UNITED STATES PATENT OFFICE.

CHARLES W. PEARSALL, OF UNION, ASSIGNOR OF ONE-HALF TO HIRAM PEABODY, OF VESTAL, NEW YORK.

CAR-VENTILATING DEVICE.

SPECIFICATION forming part of Letters Patent No. 552,300, dated December 31, 1895.

Application filed September 7, 1894. Serial No. 522,316. (No model.)

*To all whom it may concern:*

Be it known that I, CHARLES W. PEARSALL, a citizen of the United States, residing at Union, in the county of Broome and State of New York, have invented certain new and useful Improvements in Air-Motors; and I do hereby declare the following to be a full, clear, and exact description of the invention, such as will enable others skilled in the art to which it appertains to make and use the same, reference being had to the accompanying drawings, in which—

Figure 1 is a top plan of my improved air-motor with a portion of its upper horizontal wall and the valve-lids shown broken away for illustration of its internal construction; Fig. 2, a side elevation of my device with a portion thereof shown in longitudinal vertical section, bringing out interior formation; Fig. 3, an end elevation, and Fig. 4 a reduced side elevation, of said motor, illustrating its manner of application to and a utilization thereof in connection with a passenger conveyance, whereupon it is mounted, a passenger-car being delineated (in dotted work) in this instance by way of exemplification.

Like letters and numerals indicate corresponding parts throughout the several views of the drawings.

My invention has reference to that class of motors whose actuating force or impulse is derived from a current or draft of air operating upon or against internal mechanism thereof, causing thereby transmission of power or movement to other devices.

My invention has for its object the production of an air-impelled motor deriving atmospheric impulse while mounted upon any suitably-propelled land or water conveyance adapted for passenger transportation and capable of operating whenever the conveyance or carrier whereto it is secured is in motion; a device wherein the power mechanism thereof may readily be regulated to variable speed by simple regulating means irrespective of whether the conveyance to which the motor is connected is traveling longitudinally at a minimum, medium or maximum rate of progression; a motor whose action may quickly be stopped no matter how fast be the travel of the car, vessel, steamship, or other passenger conveyance whereto it is attached; a power-transmitting mechanism deriving actuating energy from the action of a current or currents of air produced by the longitudinal travel of the movable carrier serving as the motor's support; a device especially adapted for the inexpensive operation of ventilating-fans, or a small dynamo for generating electricity for incandescent lights, at suitable points or location within the interior of a car or boat; the producing of a power-distributing device particularly applicable for utilization in the insuring of the proper and desirable ventilating and cooling of the interior of cars and the cabins of vessels and steamships through the medium of fans and analogous air-agitators erected therein, and as employed in connection with the several passenger-cars constituting a steam-propelled railway-train, insuring the windows and air-ports being closed or practically so for the preventing of ingress of dust and cinders, all requisite ventilation and cooling of the interiors of the cars at virtual immunity from expense beyond the cost of the motors and auxiliary devices and the erecting thereof in position; and, finally, my purpose is the embodiment of certain details in the formation of my motor, imparting increased effectiveness, reliability and simplicity thereto.

My invention consists in the novel features of construction, operation and adaptability hereinafter set forth, and specifically enumerated in the annexed clauses of the claim.

Referring to the drawings accompanying this specification, 1 broadly designates the shell-like motor-body adapted to rest upon and be rigidly secured in a horizontal position to the level external face of the cupola or roof of a car or roof of a cabin or deck of a vessel, in this instance more particularly delineated as being mounted upon the top 4 of the cupola portion of a railway passenger-car 3, while 2 broadly denotes the lever mechanism erected within the interior of the car (or other inclosed space of a traveling passenger-carrier) underneath the roof of the cupola or the roof *per se* of the car, said lever mechanism connecting outwardly with valve lids or doors for regulating the speed of the motor or its stoppage entire, hereinafter to be specifically described.

The body 1 of the motor presents a box-like appearance, and comprises an elongated shell having end openings, which body lengthwise extends longitudinally to the direction of length of the conveyance upon which it is mounted.

*a* is the base or bottom wall of the body 1, rectangular in plan except as to a portion of its ends, said portions *w w* extending longitudinally outward a moderate distance in square-like projections.

*b* is the (in this case) front side wall, *b'* the rear side wall, and *c* the top wall, of the motor-body. The side wall *b* extending the full length of the bottom wall *a* is straight, the central portion of its upper edge being level, as at *v*, thence toward either extremity rising upward at a slight incline, as indicated at *u u*, and thence from a point moderately removed from the extremities extending incliningly downward to the ends at a satisfactory pitch, as denoted at *t t*. The upright rear side wall is similar to the forward wall, having at its top edge the same level and slanting parts, except that midway its length it is longitudinally slightly rounded, as at *s*, for a minimum distance, and therefrom its portions *t' t'* standing incliningly inward and endwise until the angular corners *r r* of the bottom plate *a* is reached, from whence the vertical side wall continues with its portions *t'' t''* parallel and flush with the contiguous side edges of the projections *w w* of the bottom *a*.

At *b'' b''* are indicated interiorly-standing walls located away from the central portion of the body 1, and presenting respectively in horizontal cross-section a somewhat V-like or angular outline, the portions *p* starting from the rear side wall adjacent the corners *r r* and standing convergingly inward a moderate distance, thence respectively terminating in the parti-circular reverse portions *p' p'*, which join into the rear side wall *b'* at its central rounded portion *s*, the radius or sweep of the portions *p' p'* coinciding with and meeting that of the aforestated portion *s* of the side wall, the triangular spaces respectively existing between the aforedescribed interior walls, and the instanding parts *t' t'* of the rear side wall create (the top plate being in place) dead-air compartments *y y*. The top plate or wall *c* stands across from side wall to side wall, and longitudinally it extends from the points marking the commencing of the projections *w w*, which extend out lengthwise from the main portion of the plate *a*, the end terminations of the top plate presenting straight edges, as at *o o*. Said top wall is perfectly flat for a distance coinciding to the length of the upper horizontally straight edges of the respective side walls, (see *n*,) and thence terminating endwise, as at *n' n'*, in upwardly-inclined planes corresponding to the slanting edges of the supporting side walls.

The two or more sections comprising the shell or hollow body 1 of my motor structure are, preferably being made of sheet metal, riveted together at flanged or overlapping parts, as indicated by the letters *m m*.

W is a horizontally-disposed propelling wind-wheel mounted in the center of the interior of the shell or body 1 upon a vertical shaft S, whereto it is suitably keyed.

D is the hollow head or drum of the wind-wheel, formed practically air-tight for insuring lightness, and *l l* are the upper and lower flanged disks thereof, and *l'* is the hub of the wheel. At proper points of the periphery of the rotating drum extend radial wings or blades K, of uniform length, whose sweep is such as to freely occupy the space existing between side wall and side wall centrally, the wings in their revolution traveling across the direct air-passage P of the shell's interior, and thence along the semicircular recess or chamber R, which is practically a dead-air compartment. The wings or blades, of rectangular form and disposed edgewise, are preferably constructed of light wood or other substance or material that will enhance exceeding lightness to the parts, it being obviously a desideratum to have the wheel in its entirety as light in weight as is consistent with needful strength and durability.

T T are throat-like passages or openings communicating from either extremity with the wheel-containing portion of the motor-body, said throats being somewhat contracted inwardly, as at *j j*, by reason of the tapering walls *p p*, hereinbefore referred to.

V V are valve-lids applied to the inlets or outlets, as the case may be, of the throat-like passages T T, said lids, of sheet metal, being each of such dimensions as to, when closed, thoroughly shut the throat-openings T T from communication with the exterior of the motor-body. These valve-lids, pivotally connected to the contiguous end portions of the top plate *c* of the shell by hinges H, are adapted when fully depressed to lie upon the tapering top edges *t t''* of the side walls of the body 1. The purpose of the portions *t' t'* of the rear wall of the body being longitudinally slanting is to insure less air obstruction than would be the case otherwise. Said motor structure is firmly mounted upon its supporting-bed, say the roof of the cupola of a car, by means of bolts *i* or other satisfactory fastenings.

The actuating-shaft S, whereto the wind-wheel is keyed, passes through an orifice in the bottom plate of the shell 1 and continues downwardly a desired distance through the roof into the interior of the car or other carrier, whereat ventilating-fans F or other appliances are so brought into relation with the rotating shaft through the medium of hangers, pulleys, belts, or shafting (see dotted work, Fig. 4 of the drawings) as to insure requisite transmission of power thereto from the revolution of said shaft.

Referring to the lever mechanism designed for the regulating of the air-supply of the motor structure, and broadly designated by the numeral 2, $d\,d$ are vertical rods or bars, respectively, loosely connected with a cleat upon the under face of the valve-lids V V, which rods, passing through longitudinally-elongated holes $z\,z$ in the bottom plate of the motor-body, penetrate by coinciding holes in the roof a moderate distance into the cupola portion of the car, (or any other traveling apartment,) where they are pivotally connected, as at 10 10, to lever rods or bars $e\,e$, that are about midway their length, each fulcrumed to a side of the car (or other conveyance) by suitable pivot bolts or pintles 12 12, secured to the car, said horizontally-inclined lever-rods terminating at their adjacent centrally-standing ends in enlarged portions $f\,f$, provided with short longitudinal slots, through which penetrate pivot-bolts 14 14, extending out on a like horizontal plane from the front face of a gage-plate G, contiguous its top end. This gage-plate, disposed lineal with the shaft S, is of flattened metal, and comprises the upright slotted body $g$ and the lower handle termination $h$, whereby it may be grasped for manipulation. Entering loosely the slot 16 of the gage-plate there is a bolt 18 extending out from the side of the car or other conveyance interiorly, and whereto same is rigidly secured. 20 is a thumb-nut working on the protruding end of the bolt 18, and upon the face of the gage-plate along one side of the slot 16 are placed numerals indicative of the adjustment of the gage to varied regulating of the motor's action in conjunction with the ratio of speed at which the car or other carrier of the motor structure is traveling.

As is evident, the travel of the car or other passenger-carrier horizontally causes displacement of the penetrated atmosphere, and creating, through suction incidental to the car's more or less rapid travel, a direct and strong current or rush of air longitudinally through the motor-body, the air-current entering that mouth and throat portion facing in the direction of the car's progress, and somewhat compressed by the contraction of the throat, said current passes directly along the air-passage P, strikes successively the wings or blades of the wind-wheel standing across its path, causing their rotary travel and thus the revolution of the wind-wheel and the rotation of the shaft whereto it is secured, the air-current after propulsion of intercepting wings discharging through the rear throat and mouth of the shell.

It will be observed that it is immaterial as to which direction the car is moving so far as the operation of my air-motor is concerned, the mouths and throat-openings appertaining to my motor structure alternately serving as ingress or egress ducts for the air-current, according to the direction the car is moving.

Obviously, the greater the speed at which the car or other conveyance is traveling the more compact and powerful will be the air-current passing through the motor-body and increased revolution of the wind-wheel result, while with less speed ordinarily the revolution of the wheel would be lessened.

It is for the regulation or adjustment of the degree of revolution of the wind-wheel and the power thus transmitted thereby, irrespective of what rate of miles per hour the travel of the car supporting my device may be, that the valve-acting lids V V and the connected lever mechanism Q are designed, the simplicity and effectiveness of which are readily discernible.

In the drawings I illustrate the valve-lids as being opened to their utmost that the motor may receive all the air-current attainable for action thereof upon the wind-wheel, the car (or other carrier) in this exemplification supposititiously traveling at a minimum rate of speed—say ten miles per hour—as indicated from the fact that the vertically movable and adjustable gage is so set and secured that the indicative number thereon for ten miles speed per hour of the car lies close to the bolt projecting through the slot of the gage-plate, the thumb-nut being tightened sufficiently to prevent displacement of said plate.

In case the car is traveling at, say, twenty or forty miles per hour, then too rapid revolution of the wheel and unisonant shaft not being desirable, I loosen the thumb-nut and raise (by the handle) the gage-plate upward to entail coinciding of the proper number on the gage with the protruding bolt and then tighten the nut, the prior upraising of the gage causing the outer ends of the fulcrumed rods $e\,e$ to become depressed, and pulling downward the upright rods $d\,d$ insures partial closing of the air-openings of the motor-body by the depression of the valve-lids and whereby a curtailment of the dimensions of the openings and reducing of the volume of the current of air passing into the motor are assured.

Evidently, at a travel of sixty miles per hour of the car the gage would be so adjusted as to entail almost complete closing of the valves, the force of the air-current otherwise being, presumptively at least, too powerful for the necessities of the case. The car being in motion and no operation of the motor being desirable, I simply so adjust the gage as to produce complete closing of the valve-lids, the air displaced by the progress of the motor-body through it gliding up the external inclined face of the forward lid and over and along the exterior of the structure.

Clearly my device is adaptable for utilization in connection with the roofs of refrigerator or other cars conveying perishable property as well as with passenger conveyances.

Having thus fully described my invention, what I claim as new, and desire to secure by Letters Patent, is—

In a device of the class described, the combination of a casing, a wheel adapted to be revolved in the casing by the air-currents passing through the latter, doors arranged to vary the strength of said air-currents, levers having link connections with the doors for operating them, a slide connected with said levers, a scale on the slide, and a pointer adjacent to the scale whereby the slide may be operated and the doors manipulated in accordance with the speed of the vehicle.

In testimony whereof I affix my signature, in presence of two witnesses, this 18th day of August, 1894.

CHAS. W. PEARSALL. [L. S.]

Witnesses:
WM. C. RAYMOND,
MARY E. DENISON.